Jan. 4, 1949.  F. A. GRUETJEN  2,457,889
WIDE PROPELLER BLADE MANUFACTURE
Filed Oct. 23, 1943  2 Sheets-Sheet 1

Frederick A. Gruetjen
INVENTOR.
BY
ATTORNEY.

Jan. 4, 1949. F. A. GRUETJEN 2,457,889
WIDE PROPELLER BLADE MANUFACTURE
Filed Oct. 23, 1943 2 Sheets-Sheet 2
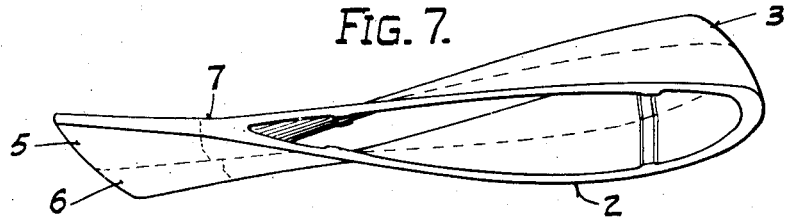
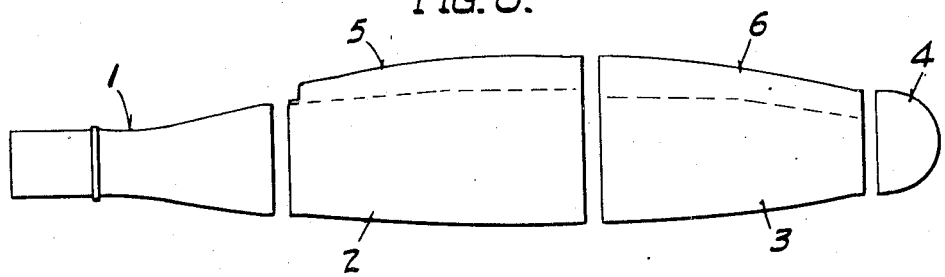
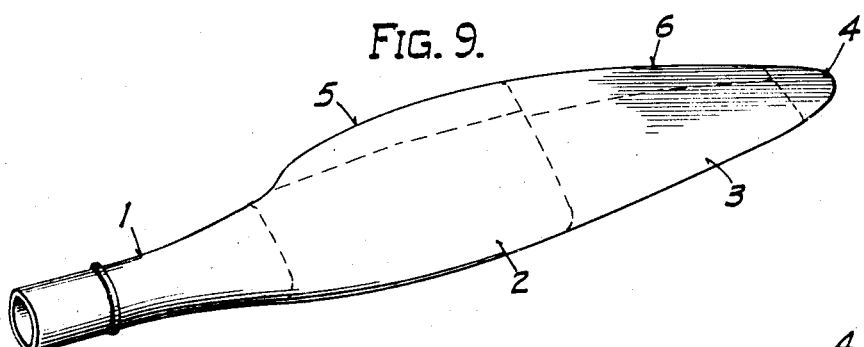
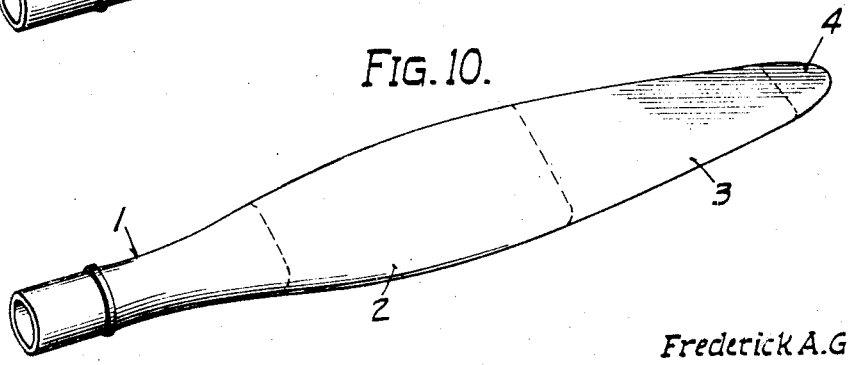
Frederick A. Gruetjen
INVENTOR.
BY
ATTORNEY.

Patented Jan. 4, 1949

2,457,889

UNITED STATES PATENT OFFICE 2,457,889

WIDE PROPELLER BLADE MANUFACTURE

Frederick A. Gruetjen, Milwaukee, Wis., assignor to A. O. Smith Corporation, Milwaukee, Wis., a corporation of New York Application October 23, 1943, Serial No. 507,367

1 Claim. (Cl. 29—156.8)

This invention relates to wire propeller blade manufacture and has been applied in the manufacture of blades of two different sizes from a single set of dies, jigs and fixtures, as well as in the manufacture of extremely wide blades for stratosphere flying.

The manufacture of hollow steel propeller blades of the electric flash welded type as set forth in the application of William C. Heath, Serial No. 480,682, filed March 26, 1943, for Electrically welded hollow steel propeller blade and method of making the same, and assigned to the assignee of the present invention, is ideal for producing a blade of either ordinary or extreme width. The present invention utilizes the Heath process and provides a more simple method for making wide blades without incurring the forging difficulties in providing a solid trailing edge portion of substantial extent.

The principal object of the invention is to provide a simple and economic method for making wide blades of the electric flash welded type.

Another object is to avoid difficult forging operations by fabricating flash welded blade sections of standard size and subsequently welding additions thereto.

In carrying out the invention the several blade sections, after fabrication, have an edge extension flash welded to the respective trailing edges. The extensions are ordinarily applied prior to welding of the sections end-to-end in the final assembly of the blade. The shank section ordinarily remains the same as for a blade without the edge extension, while a special tip may be constructed to embody the added width of the blade.

The invention is illustrated in the accompanying drawings in which:

Fig. 7 is an end elevation of the body section after trimming of the weld of Figs. 5 and 6;

Fig. 8 is a schematic layout of the sections after the edge extensions have been applied and prior to assembly end-to-end;

Fig. 9 is a perspective view of the completed blade showing the weld lines; and

Fig. 10 is a similar perspective of an ordinary blade without the edge extension and made from similar blade sections.

Figure 1:
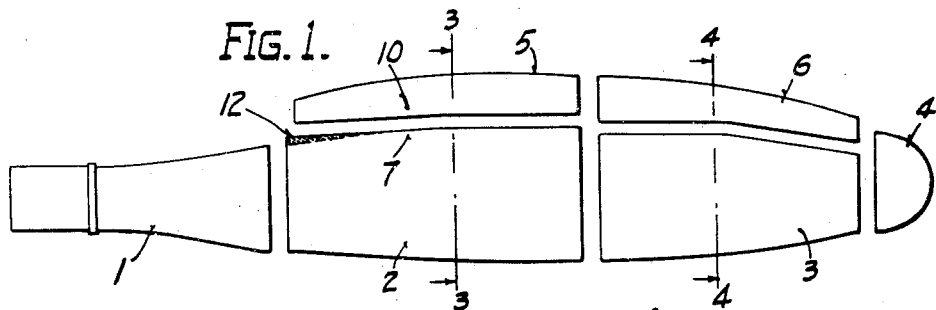
Figure 1 is a schematic layout of the blade sections and extensions prior to assembly.

In practice the two blades, Fig. 9 and Fig. 10, are constructed of sections by the Heath process described in the application above referred to and employing the same dies and welding fixtures with a few minor exceptions. The difference in construction lies in the applying of an edge extension to each blade section separately prior to assembling the sections end-to-end, in the case of the blade of Fig. 9.

The blade illustrated comprises in general a shank 1, a body section 2, a tip section 3, and a tip 4. These sections, with the exception of the tip 4 are constructed alike for the ordinary blade of Fig. 10 and for the wide blade of Fig. 9. The tip 4 is separately forged and is wider for the blade of Fig. 9 than for the blade of Fig. 10. The edge extensions 5 and 6 are applied to the trailing edges of the body section 2 and tip section 3, respectively, in making the blade of Fig. 9 from that of Fig. 10.

In making the wide blade, the forging of the trailing edges of the respective sections may be accomplished with special die inserts to provide edge portions 7 which are devoid of lateral twist and which have straight parallel elements generally at right angles to the edge so as to present a straight line approach for the edges during welding as successive edge portions are flashed away.

Figure 2:
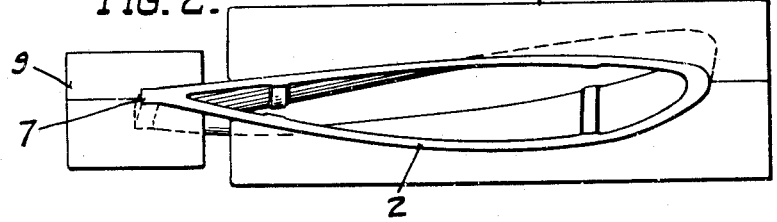
Fig. 2 is an end elevation illustrating the pressing of the body section of the blade to preform its trailing edge for welding.
Figure 3:
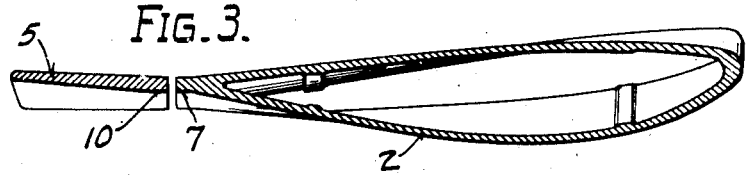
Fig. 3 is a transverse section through the body section of the blade and corresponding edge extension taken on line 3—3 of Fig. 1 and after the operation of Fig. 2.
Figure 4:
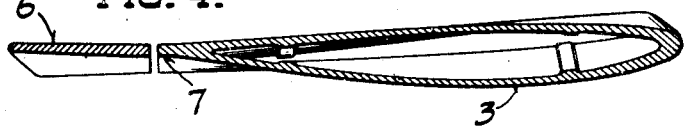
Fig. 4 is a similar section taken on line 4—4 of Fig. 1.
Figure 5:
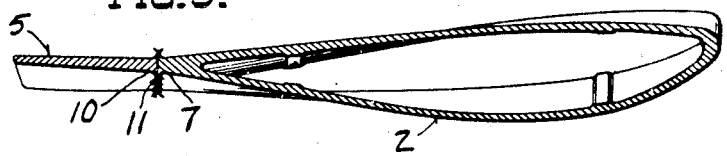
Fig. 5 is a section similar to Fig. 3 taken after the welding of the edge extension to the blade section.
Figure 6:
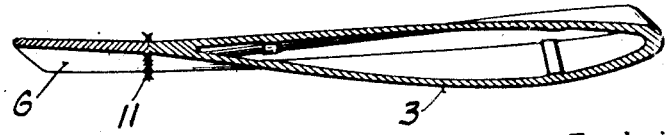
Fig. 6 is a similar section corresponding to Fig. 4 after the welding operation.

As an alternative method, the blade section is first fabricated as for an ordinary blade followed by the operation of pre-forming the trailing edge 7 of the body section 2 as illustrated in Fig. 2 to provide the straight parallel elements generally at right angles to the edge and devoid of twist so as to present a straight line approach for the edges during welding as successive edge portions are flashed away. In this operation a press is employed having suitable dies 8 for holding the main portion of the blade section in its twisted contour and a separate pair of dies 9 for subsequently pressing the edge portion 7 to shape.

The edge extension 5 is forged to its final twisted shape, embodying the pitch twist of the propeller blade, and with an edge portion 10 formed with straight parallel elements complementary to the edge portion 7 of the blade section 2 to insure that the opposing edge portions 7 and 10 are maintained in abutting alignment throughout the subsequent heating and welding operations.

In order to facilitate preparation, the edges 7 and 10 are preferably machined along straight lines longitudinally disposed at slight angles to one another instead of the ordinary curved line of the standard size blade.

The welding of the edge portion 5 to body section 2 is carried out in a suitable flash welding machine in which an electric flashing of the edges is produced under conditions of contact without pressure until the edge portions 7 and 10 are partially flashed away and the edges heated to a suitable uniform welding temperature, followed by the application of welding pressure and interruption of the current. The weld produced has the balance of edge portions 7 and 10 extruded from the plane of the parts to form a flash or fin 11 at the line of the weld. This fin 11 is subsequently removed by suitable machining operations.

The finished body section has the extension 5 integrally united thereto and embodies a continuous pitch twist without interruption at the weld line.

The tip section 3 is similarly formed, and the extension 6 is similarly welded thereto to provide a completed tip section having an integral trailing edge extension and a continuous pitch twist.

In assembling the sections, the wide tip 4 is flash welded to the outer end of the tip section 3 and its integral edge extension 6. Then the inner end of the tip section 3 is flash welded to the outer end of the body section 2, the extension 6 being welded at the same time to the inner end of the extension 5 of body section 2.

In order to provide proper blade design, the inner end of extension 5 is trimmed as shown in Fig. 9 to gradually merge with the contour of the shank 1.

Where the original trailing edge of the blank 2 curves inwardly adjacent the shank end, it may be advisable to provide an arc deposited build-up 12 on the edge prior to flash welding the extension 5 thereto. This provides a more nearly straight edge for the flash welding operation. In practice, the deposit 12 will be applied to blank 2 prior to the forming operation of Fig. 2 and the deposit will be machined or ground to constitute an integral part of the edge.

After fabrication the blade is balanced and heat treated as in previous practice.

The invention may have various embodiments within the scope of the accompanying claims.

I claim:

In the manufacture of wide hollow metal propeller blades, the steps of pressing the trailing edge of an air foil section having the pitch twist of the blade to provide an edge portion having at least one entire plane surface at substantially right angles to the chord of the blade, forming an edge extension embodying the pitch twist of the blade and having a similar corresponding edge portion, and electrically flash butt welding said formed edges together, said edge portions being substantially flashed from the parts during the welding to present an integral section of continuous blade contour after the flash has been removed from the joints.

FREDERICK A. GRUETJEN.

REFERENCES CITED

The following references are of record in the file of this patent:

UNITED STATES PATENTS

| Number | Name | Date |
|---|---|---|
| 1,488,894 | Porter | Apr. 1, 1924 |
| 1,674,674 | Wooster | June 26, 1928 |
| 1,818,492 | McFarland | Aug. 11, 1931 |
| 1,835,913 | Squires | Dec. 8, 1931 |
| 1,939,357 | Lorenzen | Dec. 12, 1933 |
| 1,996,850 | Bendix | Apr. 9, 1935 |
| 1,998,393 | Junggren | Apr. 16, 1935 |
| 2,019,329 | Warren | Oct. 29, 1935 |
| 2,031,863 | Snell | Feb. 25, 1936 |
| 2,124,548 | Dicks | July 26, 1938 |
| 2,148,555 | Hicks | Feb. 28, 1939 |
| 2,183,158 | Bennett | Dec. 12, 1939 |
| 2,214,338 | McKee | Sept. 10, 1940 |
| 2,306,177 | Mahison | Dec. 22, 1942 |
| 2,370,136 | Berliner | Feb. 27, 1945 |
| 2,383,342 | Riley | Aug. 21, 1945 |

FOREIGN PATENTS

| Number | Country | Date |
|---|---|---|
| 100,283 | Switzerland | July 16, 1923 |
| 350,859 | Great Britain | June 18, 1931 |
| 440,655 | Great Britain | Jan. 3, 1936 |
| 541,759 | Great Britain | Dec. 10, 1941 |
| 603,100 | France | Apr. 18, 1926 |